(12) United States Patent
Blanding et al.

(10) Patent No.: US 8,255,915 B1
(45) Date of Patent: Aug. 28, 2012

(54) WORKLOAD MANAGEMENT FOR COMPUTER SYSTEM WITH CONTAINER HIERARCHY AND WORKLOAD-GROUP POLICIES

(75) Inventors: William H. Blanding, Bow, NH (US); Jerry James Harrow, Jr., Brookline, NH (US); Thomas Edwin Turicchi, Dallas, TX (US); Clifford McCarthy, Richardson, TX (US); Daniel Edward Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1339 days.

(21) Appl. No.: 11/924,623

(22) Filed: Oct. 26, 2007

Related U.S. Application Data

(63) Continuation-in-part of application No. 11/590,093, filed on Oct. 31, 2006.

(51) Int. Cl.
*G06F 9/46* (2006.01)
*G06F 15/173* (2006.01)
(52) U.S. Cl. ........ 718/104; 718/100; 718/102; 718/105; 709/223; 709/224; 709/226
(58) Field of Classification Search .................. 718/100, 718/102, 103, 104, 105; 709/223, 224, 226
See application file for complete search history.

(56) References Cited

U.S. PATENT DOCUMENTS

| | | | |
|---|---|---|---|
| 6,105,053 A * | 8/2000 | Kimmel et al. | 718/105 |
| 7,089,558 B2 | 8/2006 | Baskey et al. | |
| 7,103,735 B2 | 9/2006 | Iyer | |
| 7,117,184 B1 | 10/2006 | Fontana et al. | |
| 7,363,370 B2 * | 4/2008 | Collazo | 709/224 |
| 7,516,455 B2 * | 4/2009 | Matheson et al. | 718/102 |
| 7,539,994 B2 * | 5/2009 | McAlinden et al. | 718/104 |
| 7,590,983 B2 * | 9/2009 | Neiman et al. | 718/100 |
| 8,087,025 B1 * | 12/2011 | Graupner | 718/104 |
| 2001/0034752 A1 * | 10/2001 | Kremien | 709/105 |
| 2003/0005028 A1 * | 1/2003 | Dritschler et al. | 709/104 |
| 2003/0084157 A1 * | 5/2003 | Graupner et al. | 709/226 |
| 2003/0120710 A1 * | 6/2003 | Pulsipher et al. | 709/106 |
| 2003/0177166 A1 * | 9/2003 | Robertazzi et al. | 709/105 |
| 2004/0205757 A1 * | 10/2004 | Pering | 718/102 |
| 2005/0021788 A1 * | 1/2005 | Tucker et al. | 709/229 |
| 2005/0049884 A1 * | 3/2005 | Hunt et al. | 705/1 |
| 2005/0102398 A1 * | 5/2005 | Zhang et al. | 709/225 |
| 2005/0198641 A1 * | 9/2005 | Eilam et al. | 718/104 |
| 2005/0240924 A1 * | 10/2005 | Jones et al. | 718/100 |
| 2006/0031842 A1 * | 2/2006 | Neiman et al. | 718/103 |
| 2006/0041780 A1 * | 2/2006 | Budaya et al. | 714/5 |
| 2006/0149842 A1 * | 7/2006 | Dawson et al. | 709/226 |
| 2006/0168156 A1 * | 7/2006 | Bae et al. | 709/220 |
| 2007/0136723 A1 * | 6/2007 | Smith et al. | 718/1 |
| 2007/0255833 A1 * | 11/2007 | Sharma et al. | 709/226 |
| 2008/0168451 A1 * | 7/2008 | Challenger et al. | 718/102 |

* cited by examiner

*Primary Examiner* — Emerson Puente
*Assistant Examiner* — Charles Swift

(57) ABSTRACT

A computer system characterized by a container hierarchy uses a workload manager to allocate computing resources to workloads. The workload manager can allocate resources as a function of aggregate characteristics of a group of workloads, even where the group does not conform to the container hierarchy.

40 Claims, 5 Drawing Sheets

WORKLOAD MANAGEMENT FOR COMPUTER SYSTEM WITH CONTAINER HIERARCHY AND WORKLOAD-GROUP POLICIES

This is a continuation-in-part of copending U.S. patent application Ser. No. 11/590,093, filed Oct. 31, 2006.

BACKGROUND OF THE INVENTION

A major objective of the present invention is to increase a user's ability to tailor automated workload management to meet the user's needs. The computing resources required by software workloads can vary considerably over time. Providing sufficient resources to each workload full time to handle occasional peaks can be wasteful. Dynamic workload management shifts computing resources among workloads on an as-needed basis; as a result, workload requirements can be met with fewer total resources and, thus, at lower cost.

Workload management software automatically reallocates resources in accordance with "management policies" designed to optimize the value of the computer system to the user. The policies can provide a great deal of flexibility for a user to determine how resources are to be allocated and what factors should be taken into account.

Large computer systems are often characterized by a container hierarchy. For example, a data center can include several server complexes, each complex may have several hard partitions, and each hard partition may be divided into virtual partitions or virtual machines. In such a context, there can be restrictions on some inter-container transfers of resources. These restrictions can vary by type; for example, rights to use processors are more readily transferred than the processors themselves. In any event, container-related constraints of resource allocation must be taken into account by a workload manager.

A simple utilization-based policy calls for shifting resources from workloads with lower percentage utilization of a resource to workloads with higher percentage utilizations. However, such a policy can unduly starve low-utilization workloads. This problem with starvation can be alleviated using policies that set minimum and maximum resource levels for workloads. However, this means an idle workload may get more resources than it needs, while a workload suffering high demand is throttled by a lack of the computing resources it needs. In addition, a continuously high-utilization workload can "pin" a low-utilization workload against the latter's minimum; while the minimum may prevent "starvation", the sharing of resources may not be optimal from the user's perspective.

"Own/borrow" policies also protect against starvation, but do so more flexibly than hard minima and hard maxima. Each workload is assigned an "owned" amount of resources, which is available to it when needed. A workload needing less than its owned amount releases its claim to the unneeded portion of the owned amount, making that amount available for other more needy workloads to borrow. Own/borrow policies are often used with minimum and maximum policies. However, because ownership protects against starvation, the minima can be set lower than they would be without a provision for ownership. Thus, fewer resources are wasted when a workload is actually idle or at extremely low utilization.

U.S. patent application Ser. No. 11/590,093 to Herington et al. permits polices that apply to groups of workloads as well as individual workloads. Groups can be formed by including some or all sibling containers in a container hierarchy in a group. Policies can then be applied to the group as a whole. For example, policies such as applying a group minimum or owned amounts that exceed the sum of the individual minima for a group can then be defined.

The progression of policy types described above has increased the ability of a user to define management policies that match the user's needs. The present invention provides further advances this progression.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides a user greater flexibility in defining management policies to meet user requirements by removing a constraint that groups be defined in terms of container siblings. The present invention provides for arbitrary groups of workloads, even groups that do not conform to the container hierarchy. Thus, workloads can be assigned to containers without regard to their policy groupings.

Figure 1:
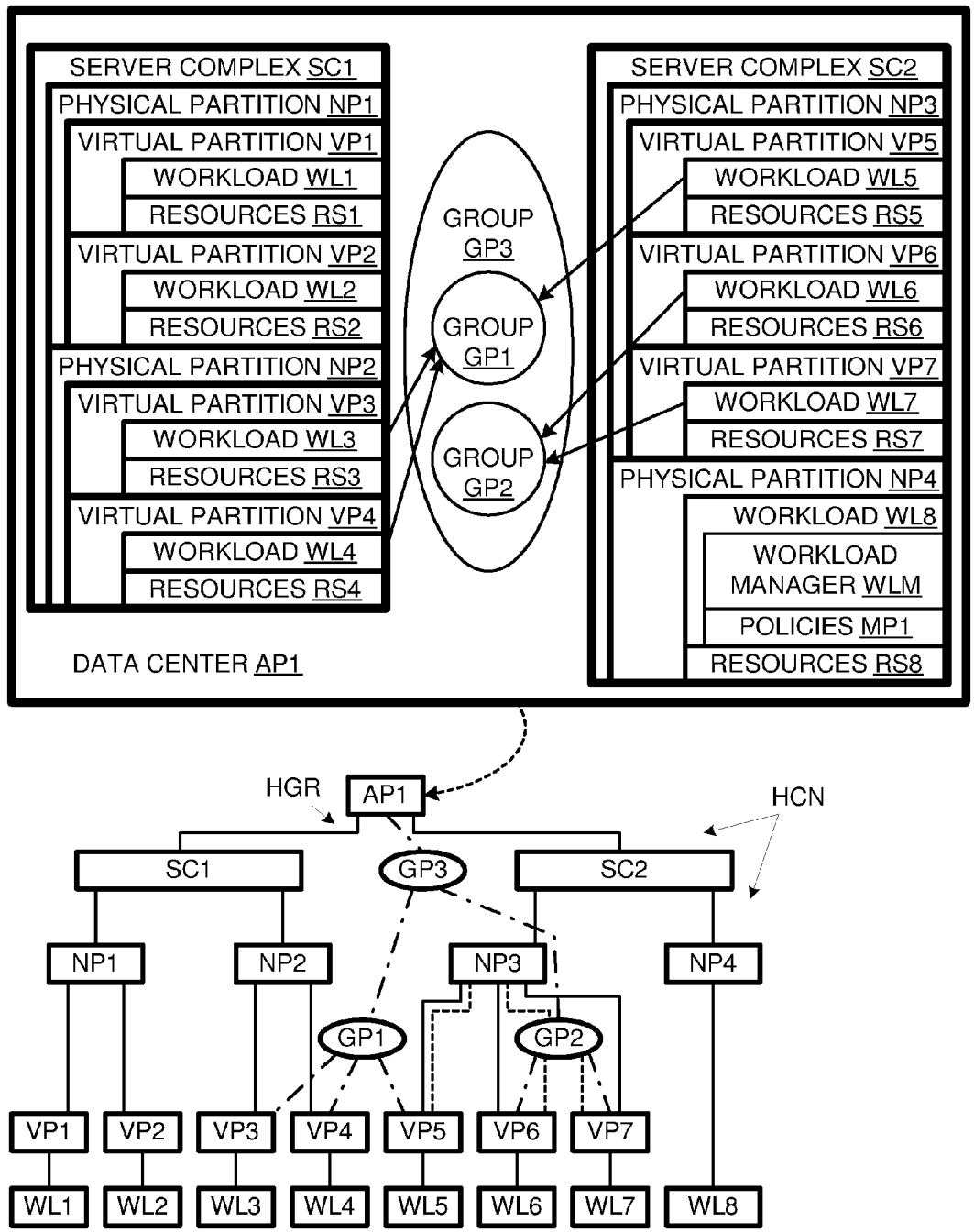
FIG. 1 is a schematic diagram of a data center in accordance with an embodiment of the invention.

A computer data center AP1 is shown in FIG. 1 comprising a container hierarchy HCN. Container hierarchy HCN includes a pair of computer complexes SC1 and SC2. Complex SC1 is divided into hard partitions NP1 and NP2, while complex SC2 is divided into hard partitions NP3 and NP4. Hard partition NP1 is divided into virtual partitions VP1 and VP2; hard partition NP2 is divided into virtual partitions VP3 and VP4, hard partition NP3 is divided into virtual partitions VP5, VP6 and VP7, while hard partition NP4 is undivided. Partitions VP1-VP7 and NP4 run respective workloads WL1-WL8 using respective sets of computing resources RS1-RS8.

Resources RS1-RS8 include processors, communications devices (I/O), memory, hard disks and other tangible, non-transitory computer readable storage media for storing code for workloads WL1-WL8, software and use-rights licenses, and some types of software. Workload WL8 includes a workload manager that implements the methods of FIGS. 1-3 in accordance with management policies MP1. Management policies MP1 set priorities for allocating resources to workloads.

It is frequently the case that some workloads are associated with others and some have no relationship. This relationship might arise from operational considerations, e.g., to the effect that the software applications comprising the workloads interact in some way to accomplish a common objective. Alternatively, the applications comprising the workloads may consume some common resources (e.g. licenses). Also, the relationship might arise from business considerations such as that the workloads are performing work required (and paid for) by a specific business entity (department, line of business, division). In any of these cases and others, it is desirable that allocation decisions be made for these related workloads not only on the basis of the individual workload policies and characteristics but also on the basis of the characteristics of and policies associated with the related workloads taken as a group.

Group polices can be used to set group minimum resources levels for a group that exceeds the sum of the minima for the members of the group; likewise, a group maximum can be set that is lower than the sum of the group maxima for the members. For example, where the user specified maxima for workloads WL6 and WL7 are six processors each, a further limit of ten processors for group GP2 can be imposed. For embodiments in which ownership levels are specified, group policies can give priority to intra-group reallocations of owned excesses and unborrowed excesses.

Group polices can also provide for more complex interactions among group allocations. For example, the amount of one type of resource allocated to a member of a group can affect the amount of a second type of resource allocated to a group. For example, there can be interaction between the amount of memory allocated to one member of a group and the number of processors allocated to another member of a group. For example, each resource type can be assigned a unit cost and resource allocation can then be constrained by a group budget. For another example, power consumption can be limited on a group basis and thus impact resource allocation.

More generally, the present invention provides for allocations of a first resource type as a function of allocations of a second type, to individual workloads or to groups. For example, the allocation of processors can be limited by a number of licenses to use the processors, or by the total cost of resources to the owner of the workload or group, or by a power budget assigned to a workload or group. The two allocations may be for two different allocation periods, but also for the same allocation period, e.g., where allocation for the first resource type is completed before the allocation for the second resource type is undertaken.

The present invention provides for applying allocation priorities to workloads on a group basis as well as on an individual basis. Management policies MP1 recognize three groups, GP1, GP2, and GP3. Group GP1 includes workloads WL3, WL4, and WL5. Group GP2 includes workloads WL6 and WL7. Group GP3 contains groups GP1 and GP2, as well as their workloads.

Group GP2 "conforms" to container hierarchy HCN, while groups GP1 and GP3 do not. A group "conforms" to a container hierarchy if and only if the containers associated with the workloads that are members of the group have a common parent container or those workload containers have a common ancestor container and each base-level container including a workgroup member is the sole workload container descendant of a child container of the common ancestor container. In other words, a group conforms to a container hierarchy if each base-level container including a workload member of the group is either a child or the sole descendent of a child of a least-common ancestor container for the group. In the case of group GP2, the least-common ancestor is hard partition NP3, and sibling virtual partitions VP6 and VP7 contain the workloads WL6 and WL7 respectively of group GP2.

The defining characteristic of a conforming group is that it can be conceptually inserted into a container hierarchy to define a new level of that hierarchy. In FIG. 1, connections in the container hierarchy are indicated by solid rectilinear lines, while connections in the group hierarchy are indicated by oblique lines. Dotted rectilinear lines indicate how group GP2 can be considered as an additional level in the container hierarchy between hard partition NP3 and virtual partitions VP5-VP7.

A group that does not meet the criterion for conforming is "non-conforming". In other words, at least one of the base-level containers including a workload member of the group must not be a child and must not be a sole descendant of a child of the least-common ancestor container for the group. Herein, a first container is a "sole descendant" of a second container if it has no siblings and no container between the first and second containers has a sibling; thus, a grandchild container can be a sole descendent of its grandparent provided it has no siblings and its parent has no siblings. Group GP1 does not conform to container hierarchy HCN. In the case of group GP1, the workloads are WL3-WL5, and the respective containers are VP3-VP5. None of these is the sole descendant of its parent, so the conforming criterion is not met. Therefore, group GP1 does not conform to container hierarchy HCN. Similarly, group GP3 does not conform to container hierarchy HCN.

Group GP3 contains groups GP1 and GP2. Thus, groups GP1-GP3 define a group hierarchy HGR. The present invention provides for groups in both hierarchical and non-hierarchical relationships. The present invention also provides for complex and simple group hierarchies. In a simple hierarchy, all groups that include a given workload are nested. Complex hierarchies omit this requirement, e.g., by including overlapping groups; however, such a complex hierarchy can be resolved into plural simple hierarchies, such as HGR.

Figure 2:
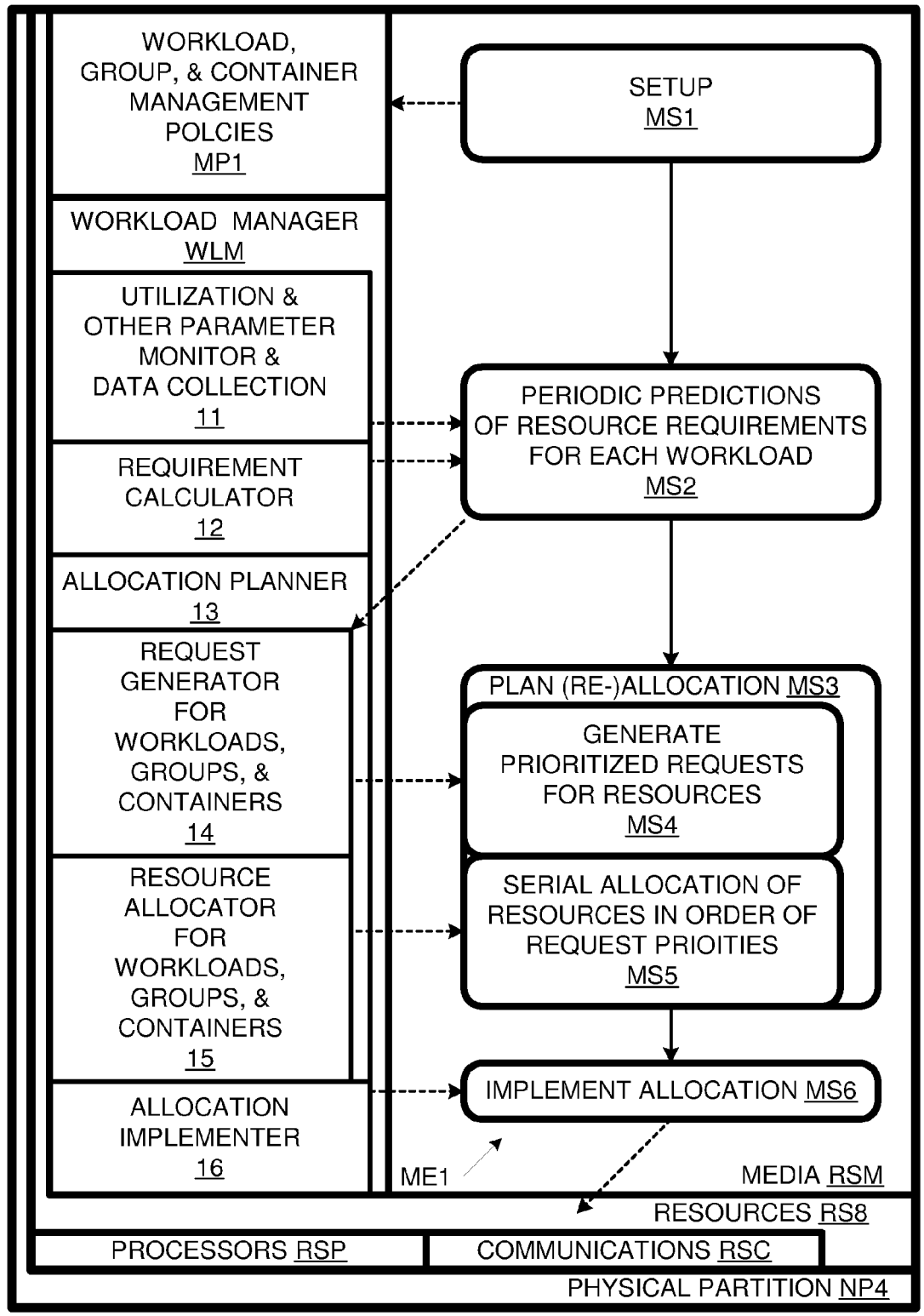
FIG. 2 is a combination schematic diagram and flow chart of a partition in which a workload manager runs in accordance with an embodiment of the invention.

FIG. 2 is a detail of physical partition NP4 including a flow chart for the operation of workload manager WLM. Physical partition NP4 includes computing resources RS8, e.g., processors RSP, communications devices RSC, and media RSM. Workload manager WLM and management policies MP1 are stored on media RSM, and workload manager WLM is executed on processors RSP. Workload manager WLM includes a monitor 11, a resource requirement calculator 12, an allocation planner 13 including a request generator 14 and a resource allocator 15, and an allocation implementer 16.

Workload manager WLM provides for a method MD in accordance with an embodiment of the invention. Method ME1 includes a setup method segment MS1, a prediction method segment MS2, an allocation planning method segment including a request generation method segment MS4 and a serial allocation method sub-segment MS5, and an implementation method segment MS6.

Figure 3:
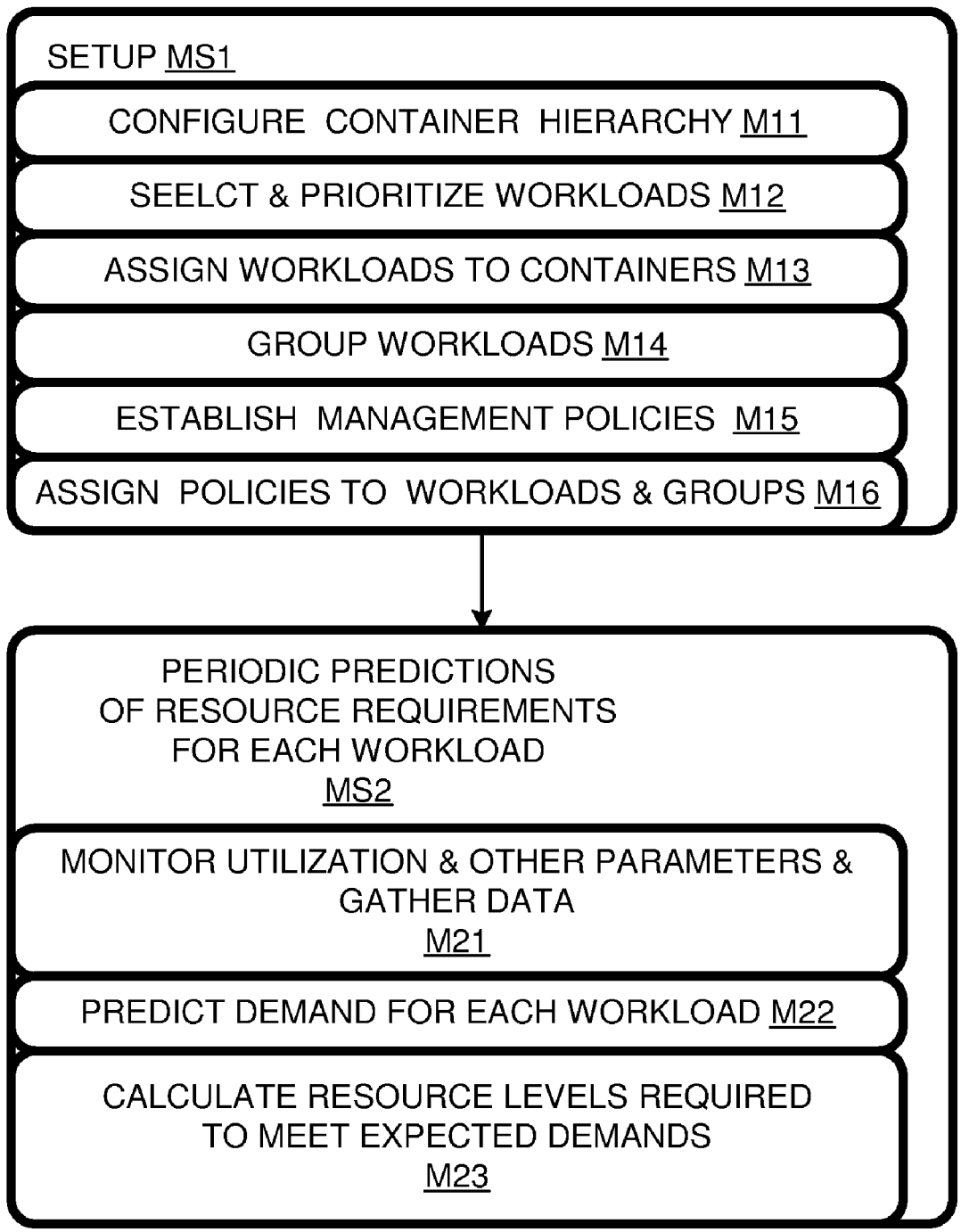
FIG. 3 is a detail of a first portion of the flow chart of FIG. 2.

Setup method segment MS1 is detailed in FIG. 3. Method sub-segment M11 involves configuring a container hierarchy. This can involve partitioning systems using various technologies (e.g., hard partitions, virtual partitions, virtual machines, process partitions), and adding and removing containers (e.g., activating and inactivating systems, partitions, etc.). The container hierarchy includes a base of containers that contain one workload apiece and an apex (e.g., data center AP1), and intermediate levels. For example, container hierarchy HCN has two intermediate levels, one defined by complexes SC1 and SC2, and the other defined by hard partitions NP1-NP3. (Hard partition NP4 is a base-level container since is not further partitioned and only includes one workload.)

Method sub-segment M12 involves selecting and prioritizing workloads (e.g., WL1-WL7) to be managed. The illustrated embodiment applies two prioritization schemes to workloads: priority levels and priority weightings. For example, each workload can be assigned a counting number indicating its "priority level". For example, in the table of FIG. 4, workloads WL1-WL7 are assigned priority levels 1-3, with 3 the highest priority. During allocation, within a request level, the requirements of a workload with a higher priority level are fulfilled before the requirements of a workload with a lower priority level are addressed.

Figure 4:
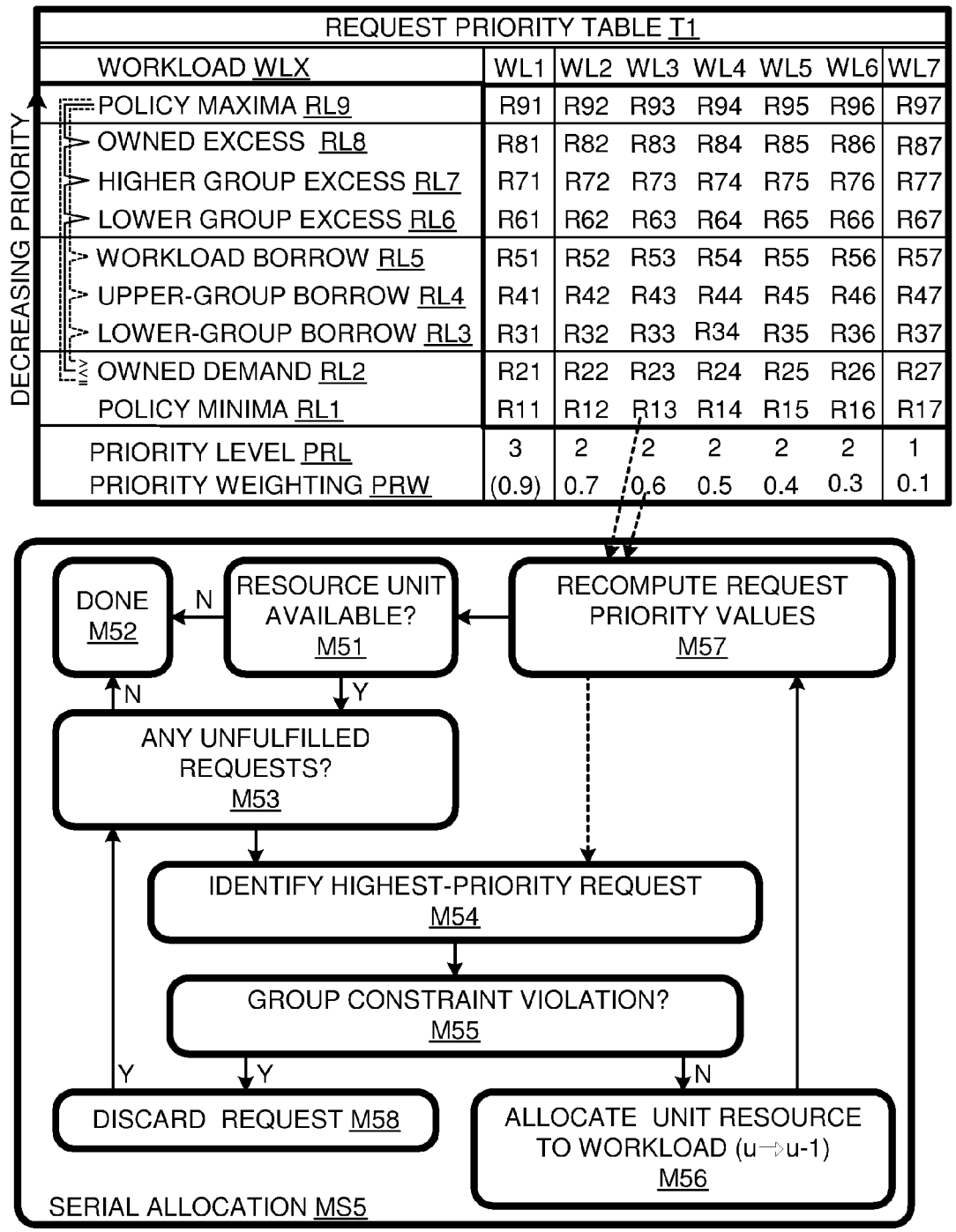
FIG. 4 is a combination table and flow chart corresponding to a second portion of the flow chart of FIG. 2.

For workloads of the same priority level, conflicts for resources are resolved using priority weightings. For example, as shown in FIG. 4, workloads WL3 and WL4 both have a priority level of 2, but workload WL3 has a weighting of 0.4, while workload WL4 has a weighting of 0.5. The priority weighting is used to calculate a priority value that determines which workload has priority. The calculation is based on a formula set by management policies MP1. For example, the formula can be w*u/r, where "w" is the weighting, "r" is the requested resource level, and "u" is the unfulfilled portion of a request. Note that the table of FIG. 4 shows initial weightings; a workload's weighting typically decreases as fulfillment is approached. While a high weighting can favor the associated workload, a workload with a lower weighting can prevail in a conflict over a resource if it is further from having its requirements met.

Method sub-segment M13 involves assigning workloads to containers. Typically, this means assigning workloads to containers (VP1-VP6 and NP4) at the base of the container hierarchy, inherently assigning workloads to the ancestor containers (NP1-NP3, and SC1-SC2) of their respective base containers. The maximum resource level of base-level containers can vary, so more demanding workloads can be assigned to containers with the greatest maximum resource capacity.

Groups of workloads are defined at method sub-segment M14. At least one of the groups is non-conforming. For example, in FIG. 1, group GP1 includes workloads WL3-WL5, which correspond to respective virtual partitions VP3-VP5. Data center AP1 is the only common ancestor, but virtual partitions VP3-VP5 are not sole descendants of children (server complexes SC1 and SC2) of data center AP1. Thus, group GP1 does not conform to container hierarchy HCN.

Management policies MP1 are established at method sub-segment M15. In the illustrated embodiment, management policies MP1 are in the form of templates that can be assigned to workloads and groups. Accordingly, the assignment of policies to workloads and to groups is a separate method sub-segment M16. In alternative embodiments, management policies refer directly to existing workloads and groups, so a separate action of assigning policies to workloads and groups is not needed.

Policies can be used to set user-specified minima and maxima for workload and group resource levels. Other policies can specify formulas to be used to determine how a resource is to be allocated. Other policies define an allocation "goodness" parameter that is to be maximized (or minimized) in resource allocation. As shown in FIG. 2, allocation planning MS3 involves two sub-segments, request generation MS4 and serial allocation of resources MS5. Management policies MP1 can impact both these sub-segments, as explained further below.

Method segment MS2 (detailed in FIG. 3) involves periodically predicting the resource levels each workload will require in an ensuing allocation period. At method segment M21, data is collected that can be used in predicting demand for the allocation period. For example, resource utilization (e.g., the percentage of available processor cycles used) can be monitored. In addition to monitoring utilization, other parameters can be monitored, e.g., the response time of an application program (which can be part of a workload). Also, external factors, e.g., time of day or year, weather, and financial markets can be considered.

The data collected in method sub-segment M21 is used to predict future demand at method segment M22. The resource levels required to meet the expected demands are calculated at method sub-segment M23. These expected demands are used by request generator 14 in determining what resources levels to request for the workloads.

The resource utilization for one period can be used to predict the utilization in the next period if the resource level stays the same. Alternatively, resource utilization can be tracked over multiple allocation periods to identify trends and patterns that can be extrapolated to predict demand for the upcoming allocation period. Typically, a desired utilization level is set, so if the predicted utilization is too high, additional resources may be required to achieve the target utilization; if the predicted utilization is low, resources may be released to other more needy workloads.

The present invention provides for a variety of approaches to allocation planning. For example, different allocations can be compared on some measure of "goodness", the best allocation being selected for implementation. The illustrated embodiment, however, provides for serial allocation of resource units in accordance with prioritized requests. This approach makes it easier for a user to control the amounts to be allocated to respective workloads.

The serial allocation of resource units corresponds to method segment MS5 in FIG. 2, which is flow-charted in greater detail in FIG. 4. Serial allocation MS5 begins with a first iteration of a method segment M51, which involves determining whether or not a resource unit is available to be allocated. Generally, there will be a unit available for the first iteration. If at a subsequent iteration of method segment M51, there are no more resource units available for allocation, serial allocation is done at method segment M52.

If a resource unit is available at method segment M51, then a check is made to determine if there are any unfulfilled requests at method segment M53. If all requests have been either fulfilled or discarded (because fulfilling them any further would violate a group constraint), serial allocation is done at method segment M52. Thus, serial allocation can end either because: 1) resources run out at the same time or before the lowest priority request is fulfilled; or 2) resources remain after all requests that can be fulfilled have been fulfilled.

If resources remain to be allocated and requests remain to be fulfilled, serial allocation proceeds to method segment M54, which involves identifying the highest-priority request. Table T1 in FIG. 4 sets forth sixty-three requests R11-R97 arranged in nine request levels RL1-RL9 for each of the seven workloads WL1-WL7. These requests are generated at request generation method segment MS4 (FIG. 2).

Request levels RL1-RL7 are in order of decreasing priority. All requests at one level are addressed before any of the requests at the next lower priority level are considered. Thus, the initial resource units will be applied toward fulfilling requests R11-R17 of request level RL1.

Within a request level, priority is determined by priority levels, with ties resolved using priority values. Table T1 lists priority levels for each workload. Workload WL1 has the highest priority level 3, so, at each request level, its requests have the highest priority and are considered first during serial allocation MS5. Workload WL7 has the lowest priority level 1; at each request level, its request is considered last. Workloads WL2-WL6 all have priority levels of 2; at each level, their requests are handled between the requests of workloads WL1 and WL7.

Within a priority level, priorities are determined by priority values. Priority values are functions of: 1) the amount (r) requested, 2) the amount (u) of the request that remains unfilled, and a priority weighting (w) for the workload (as listed in table T1). In the present case, the priority value p=w*u/r, which results in requests being filled in roughly equal proportions. Other formulae can include p=w(r−u) and p=w(r−u)/r.

The unfulfilled portion u of a request decrements each time a resource unit is allocated toward fulfilling that request. This means that priority values decrease during serial allocation. Since the priority values can change, so can the priority rankings of workloads within a priority level. For example, after request R11 has been fulfilled, the next resource unit will be allocated toward fulfilling R12, which, we can assume is for two units, so u=r=2, and the priority value p=(0.7*2/2=0.7. When that unit is allocated to workload WL2, u decrements to 1 and the priority value falls to 0.35. The priority ranking for workload WL2 falls to below that of workload WL5. Thus, workloads WL3, WL4, and WL5 will each receive a unit of resource before workload WL2 receives its second unit. Thus, priority values and weightings can provide for relatively uniform distributions.

Once the highest priority request is identified, method segment M55 calls for determining whether allocating a resource unit toward fulfilling that request would violate a group constraint. Such violations are considered further below; suffice it to say at this point that such violations are unlikely for the highest priority requests. The resource unit is allocated at method segment M56 as long as no group constraint is violated. As mentioned above, each allocation affects the amount of the unfilled portion u of the beneficiary request, so priority values are recomputed at method segment M57.

Once the priority values are updated, the next iteration of method segment M51 occurs. In an alternative embodiment, priority values are not recomputed until it is determined there are more resources to allocate and more requests to fulfill; for example, the recomputation can be performed in the course of identifying a highest priority request at method segment M54.

Requests R11-R17 are for user-specified policy minima for the respective workloads. Although no group-level minimum request levels are shown in table T1, the invention does provide for them, e.g., to meet corresponding terms of service provisions. For example, the owner of group GP1 may have a right to a minimum of eight units for GP1, but may specify that workloads WL2 and WL5 have minima of three units each. The additional group minima request levels would be for greater amounts than the workload level minima request, and so would have lower priority and be handled between them and the owned demand request level RL3.

After request R17 of request level RL1 is fulfilled, "owned-demand" requests R21-R27 of request level RL2 are addressed. These requests are for the resource amounts required to meet predicted demand up to respective owned amounts. Each workload has priority access up to its owned amount to meet its demands, but owned amounts in excess of the demand can be made available to other more needy workloads to "borrow". If its owned amount is set too low, a workload may find too often that its demands cannot be met; if the owned amount is set too high, the ability of workload manager WLM to allocate resources optimally will have been compromised. Accordingly, owned amounts should reflect a balance between the needs of an individual workload and the needs of the workloads collectively. Insofar as the owned amount acts as a kind of flexible minimum, it somewhat obviates the need for group-level minima.

Method segment MS2 of FIG. 2, and more specifically, method segment M22 of FIG. 3, predict demand levels for each workload for the upcoming allocation period. At method segment MS4, FIG. 2, request generator 14 generates requests for each workload for the predicted demand up to the owned amount. If the predicted demand is less than or equal to the owned amount, the request is for the predicted amount; if the predicted demand is greater than or equal to the owned amount, the request is for the owned amount. These requests constitute owned demand request level RL2.

Due to the high priority level of workload WL1, request R21 must be fulfilled before other requests at this level are addressed. Likewise, due to the low priority level of workload WL7, request R27 is addressed after all other requests at this level. Requests R22-R26 are handled in accordance with their changing priority values.

Three cases can be distinguished at request level RL2: 1) the predicted demand exceeds (>) the owned amount; 2) the predicted demand is less than (<) the owned amount; and 3) the predicted demand equals (=) the owned amount. For example, if the predicted demand for a needed workload exceeds its owned amount, the excess cannot be supplied at owned demand request level RL2. To meet its expected demand in this case, the needy workload can try to borrow resources at borrow request levels RL3-RL5. Since the demand exceeds the owned amount, there will be no "owned excess", so no resources can be allocated to this needy workload at owned excess request levels RL6-RL8. However, additional resources can be allocated to needy workload at policy maxima request level RL9, provided resources are still available.

The predicted demand for a temporarily satiated workload WL3 may be for less than the owned amount. In this case, no borrowing is required, so no resources are allocated to this satiated workload at borrow request levels RL3-RL5. However, there is an owned excess over the predicted demand amount, so additional resources can be allocated at owned excess request levels RL6-RL8 (as well as at request level RL9) provided resources are still available.

The owned amount can equal the demand level for the case of an at least temporarily well-matched workload. No resources need to be borrowed at request levels RL3-RL5, since the demand level is met. Also, no resources are allocated to the matched workload at owned excess request levels RL6-RL8, since there is no owned excess. If resources are still available at request level RL9, additional resources can be allocated to the matched workload.

The foregoing outcomes for "needy", "satiated" and "matched" workloads are attained by generating requests for the proper amounts. The amounts requested at borrow request levels RL4 and RL6 are the predicted demand amounts. The borrow requests for the satiated and matched workloads will already have been fulfilled, so no further allocations result at these request levels. However, needy workloads have requests that are unfulfilled during the transition from request level RL3 to request level RL4 to the extent that their demand amounts exceed their owned amounts. Note that while a workload's requests for borrow levels RL4-RL6 are usually for the same amount, the present invention does not require these amounts to be equal.

At lower-group borrow request level RL3, needy workloads can have their excess demand addressed, but only to the extent they can be satisfied by the owned excess of other members of the same lower-level group. For example, a needy workload WL2 can only add resources if group GP1 co-member workload WL5 has an owned excess to lend. Likewise, a needy workload WL3 can only borrow from group GP2 co-members WL6 and WL7. Also, if two or more workloads of a group are needy, they must contend with each other for the owned excess of other group members. On the other hand, the members of a low-level group do not have to contend with non-group members at request level RL3. Of course, if a workload is not a member of a low-level group, it cannot augment its resources at this request level since there is no workload from which to borrow.

The constraint that a workload can borrow only from a co-member of its lower-level group is implemented at method segment M55. If allocating a resource unit toward fulfillment of a borrow request identified at method segment M53 would cause the total amount borrowed within a group to exceed the total owned excess for the group, a group constraint violation is determined. In this case, serial allocation method MS5 discards the offending request at method segment M58. For example, if workload WL2 attempts to borrow from workload WL5 more than the latter's owned excess, request R32 is discarded. The resource unit under consideration is not allocated to workload WL2 and no further resources will be allocated to workload WL2 at request level RL3. However, any resources previously allocated to workload WL2, even if they were toward fulfilling request R32, are retained.

When a request is discarded at method segment M58, the pending resource unit remains available for allocation. In this event, serial allocation method MS5 proceeds to method segment M53 to determine if there are any further requests (at the current or a lower-priority request level) to be considered. Of course, if there are no more requests, serial allocation is done at method segment M52. In the more usual case, there is another request to be considered. Of course, the formerly highest priority request has been discarded, so a new highest priority request is found. This approach to handling group-level constraints also applies to upper group borrow request level RL4.

If a needy workload finds its demand level is still not achieved at lower-group request level RL4, it can expand its horizons at request level RL5 and seek to borrow from co-members of a higher-level group, in this case, group GP3. Of course, the needy workload will have already borrowed what it could from its lower-level group member, so that source is dry at the next level. Also, other workloads may have had priority access to owned excess at the lower-group request level RL3. However, any unclaimed owned excess from upper-level group members may be allocated to a needy workload.

If there are additional levels of the group hierarchy, a needy workload is treated to ever expanding horizons of borrow sources, with caveats analogous to those encountered at request level RL4. Finally, if resources remain available for allocation, needy workloads can seek to borrow from other workloads without regard to group boundaries at request level RL5: data center AP1 is the apex group in which all workloads WL1-WL7 are co-members.

When supply exceeds demand, there can be amounts available to lend in excess of the amounts borrowed to meet demands. In such cases, the lenders can reclaim the unborrowed portions of their owned excess. Thus, lenders can use their unborrowed excesses as "cushions" in case actual demand exceeds predicted demand. This reclaiming occurs at owned excess request levels RL6-RL8 of requests R61-R87 for owned amounts. Workloads whose demand levels equal or exceed their owned amounts will not have any resources allocated to them at this level.

As with the borrow request, the owned excess requests are stratified into three levels, in this case, request levels RL6-RL8. Requests R61-R87 are all for respective owned amounts, although the invention provides for deviations from this scheme. The concept here is that owned excess amounts are reclaimed within lower level groups, then within upper-level groups before reclaiming can occur without respect to groupings. Assuming group-owned amounts equal the sums of the owned amounts of member workloads, this arrangement preferentially reclaims unborrowed excess resources for lender workloads that are members only of net-lender groups. Of course, the invention provides for other schemes to achieve other objectives.

It is often possible to achieve the same or similar outcomes using different allocation schemes. For example, a single level of reclaim requests can be used with a constraint such as "allocate only to lender groups that are members only of net-lender groups" to achieve a result similar to that described in the foregoing paragraph.

In some grouping schemes it may be necessary or desirable that every workload be represented at every group level. In this case, ungrouped workloads can be considered as the sole members of dummy groups, e.g., DG1-DG4, FIG. 1) at each group level.

If resources are still available, requests at policy maximum request level RL9 are considered. The present invention provides for group analogs of the policy maxima. These would be for amounts lower than the sum of the policy maxima for the included workloads (and, for upper-level groups, for the included groups). Again, the use of the flexible own/borrow model largely obviates the need for group maxima request levels. However, they might be required to meet terms of use provisions.

In the foregoing description, it is assumed that the resource being allocated can be allocated without restrictions other than those set forth in management policies MP1. However, depending on the type of resource being allocated, there can be restrictions based on hardware or platform limitations. For examples, a hardware partition may require at least one processor to operate at all and may have a limit on the amount of memory it can accommodate.

Also, workload manager programs generally cannot implement allocations that require hardware to be physically moved. For example, a processor on server complex SC1 cannot be automatically transferred to server complex SC2 in the course of reallocation. To some extent, such as transfer can be effected by maintaining processor reserves for each complex and transferring use rights for the processors from one complex to the other. However, such transfers are typically not arbitrary, but are usually confined to within resource domains (which themselves can constitute a level in a container hierarchy).

The present invention provides for a variety of methods of addressing container-related restraints. Some container constraints can be treated as non-user-specifiable policies. Minimum resource requirements can be specified as an additional resource request level with a priority higher than that of policy minimum. Likewise, maximum resource limitations can be specified as an additional resource request level with a priority lower than policy minimum request level RL9. Container-related constraints can be imposed at method segment M55 (FIG. 4) along with group constraints.

Figure 5:
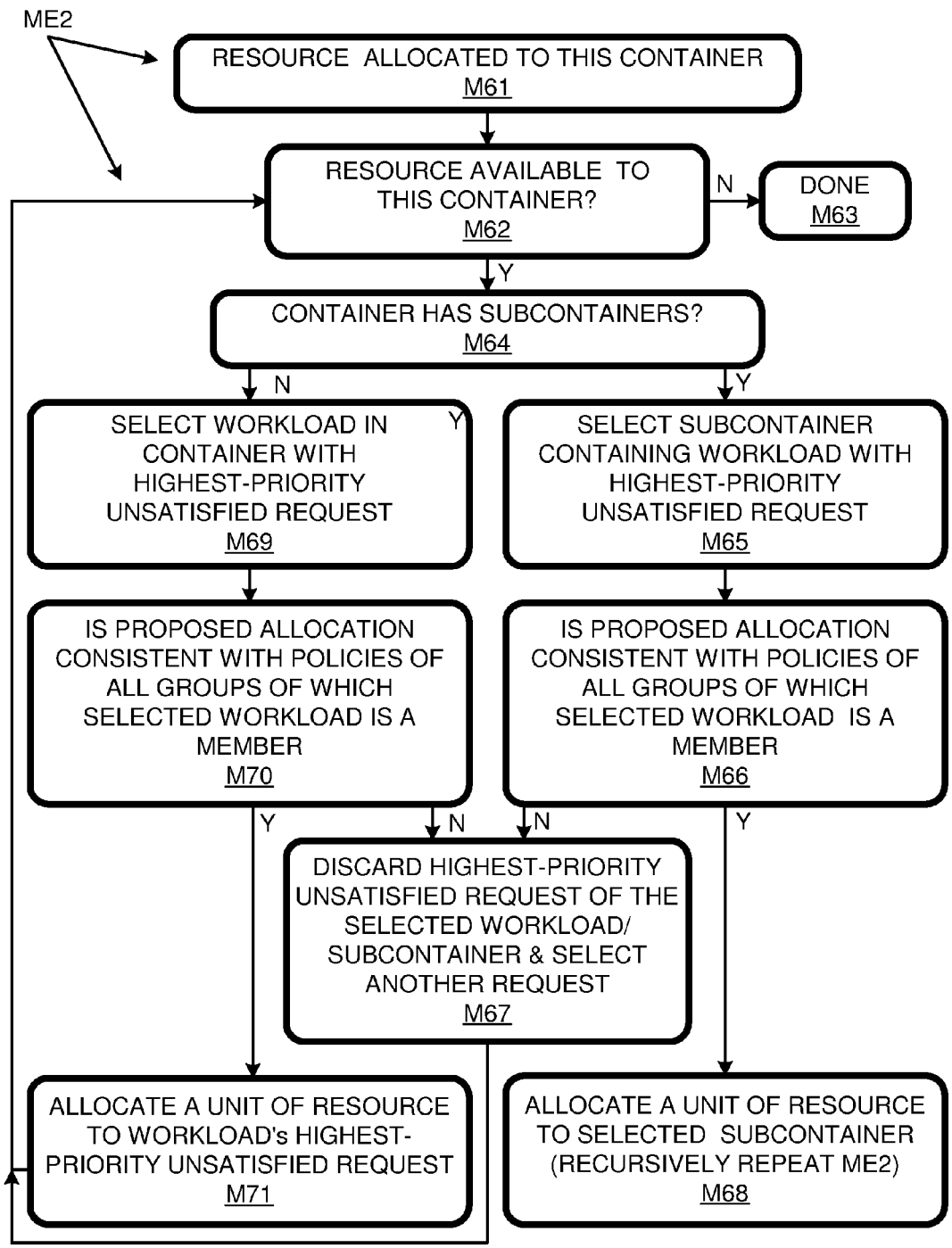
FIG. 5 is a flow chart showing how hierarchical container constraints can be handled explicitly during resource allocation in accordance with an embodiment of the invention.

Alternatively, container constraints can be addressed separately and explicitly using the serial allocation method ME2 flow charted in FIG. 5. Method ME2 provides for group resource allocation in a container hierarchy in which resource containers may be nested within larger containers. This method is repeatedly executed until all units of a resource are allocated. The method is entered at segment M61 with a unit or units of resource to be allocated. (In a hierarchical domain, the initial entry would be for the "root" container, in this case, data center AP1, that contains all others, and the resource amount would be all of the resource to be allocated across the container. The same method would subsequently be used to allocate units of resource within a sub-container to its sub-containers or its workload.)

Method ME2, as flow-charted in FIG. 5, begins with a source being allocated to a container. Method segment M62 involves determining whether a resource is available to fulfill this allocation. If no resource is available, the method is done at method segment M63. If method ME2 is being executed for the root container this exit indicates that allocation of the resource is complete. If method ME2 is being executed for a sub-container, this exit means that the unit or units of resource allocated to that sub-container by its parent have been accomplished, and that the parent can continue allocating any further resource available to it.

In general, resources are not freely allocable. For example, a processor residing in complex SC1 cannot be allocated to a workload running on complex SC2. This limitation can be circumvented by maintaining reserve processors in each complex that can be activated and deactivated. Thus, to transfer a processor from complex SC1 to complex SC2, one can deactivate a processor on complex SC1 and activate on complex SC2. The portion of a container hierarchy within which a resource can be reallocated is called a "resource domain". The grouping of containers into resource domains can vary according to the resource being allocated. It should be noted that the present invention provides for multiple and overlapping shared-resource domains where different computing resources have respective resource domains. For example, one resource domain could be defined for sharing processors while another could be defined for sharing software licenses for a database program. In any event, restrictions on transfers between workloads in different resource domains are addressed at method segment M62.

A determination is made whether or not the subject container has sub-containers at method segment M64. If the subject ("this") container has sub-containers, the sub container with the workload having the highest-priority unsatisfied request is selected at method segment M65. A proposed allocation of the resource to that workload is evaluated for possible conflicts with group-level policies vis-á-vis all groups including that workload. If it is not consistent with group-level policies, the associated highest-priority request is discarded at method segment M67, and method ME2 returns to method segment M62 to consider the next resource.

If there is no conflict with group-level policies, a unit of resource is allocated to the subject sub container at method segment M68. This amounts to selecting a new container for which method ME2 must be iterated. In other words, method ME2 is recursively repeated for each level of the container hierarchy for each resource allocation. Eventually (or immediately in a single-level grouping scheme), the bottom level of the hierarchy is reached, and so that the answer at method segment M64 is "no".

If "this" container has no sub-containers, the workload with the highest-priority unsatisfied request is selected at method segment M69. A proposed allocation of the resource under consideration to this workload is evaluated for conflicts with group-level constraints at method segment M70. If there is a conflict, the request is discarded at method segment M67, and method ME2 returns to method segment M62. If there is no conflict, a unit of resource is allocated to fulfill the workload's highest-priority unsatisfied request. In this way, it can be seen that Method ME2 will be invoked first for the root container of the container hierarchy and then subsequently for each smaller sub-container along the path of segments M62-M64-M65-M66-M68 until finally it is invoked for a sub-container which contains only a single workload whose request has been selected at which point the path of segments M62-M64-M69-M70-M71 is followed to allocate the resource to the selected request of the selected workload. That allocation having been made, the invocation of Method ME2 for the smallest sub-container will exit at segment M63 and the allocation of resource by the parent of that sub-container will continue until the resource allocated to it has in turn been allocated to its sub-containers, whereupon it exits at segment M63 in favor of its parent. When the root container finally exits at segment M63 the allocation of the resource for the hierarchical domain has been completed.

During resource allocation, any resource allocation made to any workload with an associated group is also recorded as part of the allocation state for that group and its ancestors. That state includes at least an owned amount and a maximum amount. The owned amount is decremented by any resources allocated to a workload associated with the group to satisfy a minimum, owned or group owned request. The maximum amount is decremented by any resource allocated to any workload associated with the group.

During resource allocation, any resource allocation proposed to be made to any workload which is a member of a group, to satisfy a "group owned" request is evaluated by comparing it to the owned amount balance (i.e. the unused owned amount of the group) for that group and the proposed allocation is reduced to be not more than the owned amount balance of the group. The net effect of this is to allow "group owned" requests to be satisfied only up to the limit of the owned balance remaining to the group whose workload was responsible for the request.

During resource allocation, if the group is specified to be part of a hierarchy of groups, this evaluation needs to be carried out for the group itself and for each of its ancestor groups. In this case, the evaluation for a particular group includes the determination that the group is tagged as described, that the request "level" corresponds to the group "level", and the comparison of the proposed allocation with the owned resources balance for that particular group. The net effect of this for a workload which is a member of a group which is in turn "aggregated" into a hierarchy of more encompassing groups is that "group owned" requests for the workload may be satisfied first by borrowing from immediate group members up to the level of unused resources within the group and then, at a lower priority, from members of other groups which have the same parent group as the workload's group up to the level of unused resources within the parent group and so on.

Furthermore, during resource allocation, any resource allocation proposed to be made to any workload which is a member of a group, to satisfy any request is compared to the maximum amount balance for that group and similarly for any ancestor groups of that group and the proposed allocation is reduced to be not more than the smallest maximum amount balance of any group or ancestor group with which the workload is associated. The net effect of this is to allow any requests to be satisfied only up to the limit of the maximum balance remaining to the group whose workload was responsible for the request.

Similar to the discussion for group-owned amounts, evaluation of group maxima may be controlled through association of policy information with individual groups in a hierarchy of groups. However, in the case of group-owned amounts, unused resources of an ancestor group can satisfy a group owned request that could not be satisfied by a descendant group. In the case of group maxima, each ancestor group must have a group policy maximum that is less than the sum of the maxima associated with its "child" groups or its maximum will have no effect.

For another alternate application of workload groups and group policies, consider a situation in which a cost can be associated with each unit of resource allocated to each workload. This cost could be workload specific (i.e., it could result from a "contract" governing consumption of resources by the workload), it could be group specific (i.e., it could result from a "contract" governing consumption of resources by all the workloads in a group, the group perhaps corresponding to some specific business entity) or the cost could be resource domain specific.

In any of these cases the rules for computing these costs could be predetermined or, more typically, a function of policy information associated with the workload, group, or resource domain. Then policies governing the "budget" for such a cost could be defined for workload groups such that each increment of resource considered for allocation to any workload in a group would invoke evaluation of the cost associated with the accumulated resource allocated to the group and with the additional cost of the new allocation.

The results of the evaluation determine whether or not the proposed new allocation was within the budget specified by the policy associated with the group or not and consequently whether or not the additional allocation would be permitted according to that policy. The cost could be monetary, or expressed in other units. For example, it could reflect the electrical power and/or cooling consumed by the resources allocated to the workload. Alternatively the cost could be associated with the use of licenses to use computer resources.

This invention serves a variety of purposes. It is sometimes desirable that the resources owned by related workloads be able to be borrowed preferentially by related workloads, i.e. that the owned resources of the related workloads be considered a resource sub-pool that is preferentially available to those related workloads.

In addition, it is sometimes the case that a user wishes to limit the maximum resources available not just to individual workloads, but also to impose maxima on groups of associated workloads. An example would be the relationship of CPU resources and software licenses, where there could be a maximum of CPU resources allocatable to individual workloads in a group, but a smaller maximum allowed to be allocated to the group as a whole due to licensing restrictions.

Under some conditions it may be desired that workloads be considered as members of overlapping groups. In addition, groups of workloads may have interrelationships themselves. For example, groups may represent business entities such as departments, and these department groups themselves may be grouped into divisions—thus there may be a hierarchy of group relationships that is distinct from any structural relationships between the resource containers within which workloads which are members of said groups execute. It is desirable that the grouping relationships be able to be expressed and manipulated independently of the container hierarchy.

Herein, a "lender" workload is a workload for which the predicted demand amount of resources is less than its respective owned amount of resources. A "borrower" workload is a workload for which the predicted demand amount of resources is greater than its respective owned amount. A "net-lender" group is a group for which the total amount of the difference between owned and demand amounts for lender groups exceed the total amount by which the owned amount exceeds demand amounts for respective borrower groups.

Herein, unless otherwise indicated, "before" refers to a priority relationship rather than a temporal one. Allocating according to one criterion "before" allocating to a second criterion, means the priority of the first criterion is higher than the priority of the second criterion. In a serial allocation, higher-priority allocations tend to be made temporally before lower-priority allocations, hence the association of "before" with priority. However, there are many mathematically equivalent ways of accomplish similar ends in a computer environment, so the temporal aspect does not always hold.

An "aggregate characteristic" of a group is the sum of that characteristic as applied to workload members of that group. For example, a group can have an aggregate owned excess, an aggregate demand deficiency, an aggregate unloaned owned excess. In addition, groups can have net characteristics, such as a net owned excess equal to the aggregate owned excess less the aggregate demand deficiency. A negative net owned excess corresponds to a positive net demand deficiency.

"Workloads" consist of computer-executable entities to which the assignment of hardware and software computing resources can be controlled. It is usual to consider workloads as executing in resource containers (e.g., compartments, partitions, operating system instances) to which computing resources may be allocated and assigned. That is, a resource container is an operating system construct within which the workload executes and whose consumption of resources can be monitored and, optionally, controlled.

Herein, "computing resources" refers to quantifiable entities that can be assigned to partitions or other containers, wherein an assigned quantity has an effect on the function, performance, or cost associated with a workload running in that container. Examples of such resources include: processors, storage media, communication or I/O devices, computer software programs, environmental resources such as electrical power and cooling, and licenses for the use of such resources. Resources are commonly considered and manipulated as multiples of some minimum quantity or resource unit, which may be a natural consequence of the characteristics of the resource (e.g. individual processing units) or selected for reasons of convenience or performance (e.g. blocks of storage resource). Herein, "storage media" refers to tangible, non-transitory media that is used for storing computer programs and data.

The notion of "computer resources" can encompass data center wide resources such as electrical power and cooling or even monetary resources given suitable means for monetizing consumption of non-monetary resources. Therefore, the scope of a container hierarchy is not limited by the physical or electronic configuration of computer systems. Instead, the scope may be selected for the convenience of the management to be performed, so long as the structural limitations of the domain are considered in its management. For example, the transfer of certain resources may be restricted by physical, electronic or software considerations.

The present invention can apply to systems with any number of partitions or workloads among which resources can be allocated. The resources can be processors, storage media, and communications devices. Resources or workloads may be considered for reassignment amongst resource containers. Each category can be considered separately, and types within each category (network interfaces versus disk interfaces, disk-based storage versus main memory) can be considered separately.

In some embodiments, resource types are considered in combination, e.g., delay in the reassignment of processors can affect the delay in the reassignment of main memory that should be allowed. The invention comprises the planning of resource and/or workload reassignment or transfer; performing the actual transfer is an optional step. These and other variations upon and modifications to the illustrated embodiments are provided for by the present invention, the scope of which is defined by the following

What is claimed is:

1. A computer system comprising:
computing resources including hardware processors;
containers in which computer workloads are run using said processors and to which said resources can be allocated, said containers being arranged in a container hierarchy;
a workload manager for allocating computer resources to said containers as a function of aggregate characteristics of groups of workloads running in said containers, wherein a first group of said groups does not conform to said container hierarchy; and
wherein said container hierarchy includes:
a least-common ancestor container for said first group, said least-common ancestor containing all workload members of said first group, said least-common ancestor not having a child container that contains all members of said first group; and
at least a first base-level container containing exactly one workload member of said first group, said first base-level container not being a child of said least-common ancestor and not being a sole base-level descendant of a child of said least-common ancestor.

2. A system as recited in claim 1 wherein minimum and owned amounts are assigned to said workloads so that a workload having a predicted-resource amount less than its owned amount makes an unneeded portion of its owned amount available for other workloads to borrow, said workload manager determining predicted-resource amounts for each of said workloads and associates owned-resource amounts with each of said workloads, said workload manager allocating resource units so that resource amounts equal to the minimum of said predicted and said owned amounts are allocated to all of said workloads before any workload is allocated predicted amounts in excess of its owned amount.

3. A system as recited in claim 2 wherein said workload manager allocates resource units associated with an aggregate owned excess of a group to workloads in said group having an owned deficit before allocating them to workloads not in said group.

4. A system as recited in claim 3 wherein resources in excess of those required to satisfy the predicted amounts for all groups are allocated only to workloads for which all including groups have net owned excesses in that their aggregate owned excess exceeds their respective aggregate owned deficits.

5. A system as recited in claim 1 wherein said workload manager allocates resource units of a first type in part as a function of an allocation of units of a second type.

6. A method comprising:
monitoring utilization of computing resources by computer workloads running within resource containers containing said computing resources, said computing resources including hardware processors, said resource containers being arranged in a container hierarchy;
periodically reallocating said computing resources to said containers as a function of aggregate characteristics of groups of said workloads running in said containers, wherein a first group of said groups does not conform to said container hierarchy; and
wherein said container hierarchy includes:
a least-common ancestor container for said first group, said least-common ancestor containing all workload members of said first group, said least-common ancestor not having a child container that contains all members of said first group; and
at least a first base-level container containing exactly one workload member of said first group, said first base-level container not being a child of said least-common ancestor and not being a sole base-level descendant of a child of said least-common ancestor.

7. A method as recited in claim 6 further comprising:
determining predicted-resource amounts for each of said workloads;
associating owned-resource amounts with said workloads so that a workload with a predicted-resource amount less than its owned amount makes an unneeded portion of its owned amount available for other workloads to borrow; and
allocating resource units so that resource amounts equal to the minimum of said predicted and said owned amounts are allocated to all of said workloads before any workload is allocated predicted amounts in excess of its owned amount.

8. A method as recited in claim 7 wherein said allocating further involves allocating resource units associated with an aggregate owned excess of a group to workloads in said group having an owned deficit before allocating them to workloads not in said group.

9. A method as recited in claim 8 wherein said allocating further involves allocating resources in excess of those required to satisfy the predicted amounts for all groups are allocated only to workloads for which all including groups have net owned excesses in that their aggregate owned excess exceeds their respective aggregate owned deficits.

10. A non-transitory computer-readable storage media comprising a workload manager for:
monitoring utilization of computing resources by computer workloads running within resource containers for containing said computing resources, said computing resources including hardware processors, said resource containers being arranged in a container hierarchy;
periodically reallocating said computing resources to said containers as a function of aggregate characteristics of groups of said workloads running in said containers, wherein a first group of said groups does not conform to said container hierarchy; and
wherein said container hierarchy includes:
a least-common ancestor container for said first group, said least-common ancestor containing all workload members of said first group, said least-common ancestor not having a child container that contains all members of said first group; and
at least a first base-level container containing exactly one workload member of said first group, said first base-level container not being a child of said least-common ancestor and not being a sole base-level descendant of a child of said least-common ancestor.

11. The non-transitory computer-readable storage media as recited in claim 10 wherein said workgroup manager further provides for:
determining predicted-resource amounts for each of said workloads;
associating owned-resource amounts with each of said workloads so that a workload with a predicted-resource amount less than its owned amount makes an unneeded portion of its owned amount available for other workloads to borrow; and
allocating resource units so that resource amounts equal to the minimum of said predicted and said owned amounts are allocated to all of said workloads before any workload is allocated predicted amounts in excess of its owned amount.

12. The non-transitory computer-readable storage media as recited in claim 11 wherein said allocating further involves allocating resource units associated with an aggregate owned excess of a group to workloads in said group having an owned deficit before allocating them to workloads not in said group.

13. The non-transitory computer-readable storage media as recited in claim 11 wherein said allocating further involves allocating resources in excess of those required to satisfy the predicted amounts for all groups are allocated only to workloads for which all including groups have net owned excesses in that their aggregate owned excess exceeds their respective aggregate owned deficits.

14. A computer system comprising:
   computing resources including hardware processors;
      containers in which computer workloads are run using said processors and to which said resources can be allocated, said containers being arranged in a container hierarchy;
      a workload manager for allocating computer resources of a first type to said containers as a function of allocations of resources of a second type to said containers; and
   wherein said container hierarchy includes:
      a least-common ancestor container for said first group, said least-common ancestor containing all workload members of said first group, said least-common ancestor not having a child container that contains all members of said first group; and
      at least a first base-level container containing exactly one workload member of said first group, said first base-level container not being a child of said least-common ancestor and not being a sole base-level descendant of a child of said least-common ancestor.

15. A computer system as recited in claim 14 wherein said first and second allocations are for the same allocation period.

16. A computer system comprising:
   computing resources including hardware processors;
   containers in which computer workloads are run using said processors and to which said resources can be allocated, said containers being arranged in a container hierarchy;
   a workload manager for allocating computer resources of a first type to said containers as a function of aggregate allocations of a second type of resources to a group of said workloads; and
   wherein said container hierarchy includes:
      a least-common ancestor container for said first group, said least-common ancestor containing all workload members of said first group, said least-common ancestor not having a child container that contains all members of said first group; and
      at least a first base-level container containing exactly one workload member of said first group, said first base-level container not being a child of said least-common ancestor and not being a sole base-level descendant of a child of said least-common ancestor.

17. A computer system as recited in claim 16 further comprising management policies that specify how aggregate characteristics of allocations of resources of a second type control the allocation of the resource of the first type.

18. A computer system as recited in claim 17 wherein the amount of the resource of the second type may be determined from the allocation of the resource of the first type.

19. A computer system as recited in claim 18 wherein allocation amounts of the resource of the first type are allowed or not as determined from the aggregation to said groups of workloads of the corresponding allocations of the resource of the second type.

20. A computer system as recited in claim 19 wherein the resource of the second type relates to energy consumption.

21. A computer system as recited in claim 19 wherein the resource of the second type is a monetary or budgetary resource.

22. A computer system comprising:
   plural containers for running respective workloads, wherein one or more computing resources are subject to monitoring and control, said containers being arranged in a container hierarchy, said resources including processors and at least one of storage media, communication or I/O devices or computer software programs stored on a non-transitory computer-readable storage medium, and/or licenses for the use of said resources;
   a resource planner for planning an allocation of said resource type wherein said allocation planner makes allocation decisions based upon factors which include at least one of:
   resource management policy parameters specifying resource constraints, and desired workload operating characteristics assigned automatically or by user selection to said workloads, resource requests of said workloads,
   the availability of said resources, and
   the structural relationships of the resource containers wherein said workloads may be further identified, automatically or by users, by associations with other workloads, such associations including groups of workloads,
   said group relationships being an additional factor in said resource allocation decisions of said resource planner; and
   wherein said container hierarchy includes:
      a least-common ancestor container for said first group, said least-common ancestor containing all workload members of said first group, said least-common ancestor not having a child container that contains all members of said first group; and
      at least a first base-level container containing exactly one workload member of said first group, said first base-level container not being a child of said least-common ancestor and not being a sole base-level descendant of a child of said least-common ancestor.

23. A computer system as recited in claim 22 wherein at least some of said workloads are assigned to groups without limitation with regard to the structural relationships of the resource containers within which the workloads execute.

24. A computer system as recited in claim 22 wherein a hierarchical structure is imposed upon some or all of said groups such that in addition to workloads being associated with groups as members, groups may also be members of more encompassing groups.

25. A computer system as recited in claim 22 wherein said groups are organized so as to reflect the business entities with which said workload group members are associated.

26. A computer system as recited in claim 22 wherein at least some of said groups of workloads are assigned one or more policy parameters distinct from the policy parameters associated with the individual workloads, and some of said group policy parameters are an additional factor in said resource allocation decisions of said resource planner.

27. A computer system as recited in claim 26 wherein said resource planner considers said group policy parameters in its allocations, keeps track of the allocation of resources to the members of the groups and allows or disallows certain of said workload resource requests for workloads which are members of groups based at least in part on the relationship of the cumulative resources allocated to all group members to one or more of said group policy parameters.

28. A computer system as recited in claim 27 wherein at least some of said group policy parameters, comprise group owned resource amounts for one or more resources, distinct from the policy owned resource amounts which may be assigned to the individual workloads, where policy owned resource amounts specify resources which are reserved preferentially, in the event of need, for their associated workloads and groups respectively and said resource planner considers said group owned resource amounts in its allocation decisions.

29. A computer system as recited in claim 28 wherein at least some of the group owned resource amounts are specified to be the sums of the respective policy owned resource amounts of the respective members of the group.

30. A computer system as recited in claim 28 wherein said resource planner performs resource allocation in such a way that some workload resource requests which exceed the policy owned amount reserved for said workloads, may nevertheless be filled if the cumulative resources allocated to all group members does not exceed said group policy owned amount limit, said resource allocation performance giving the effect that the policy owned amount of the group is shared by said group members.

31. A computer system as recited in claim 29 wherein said resource planner performs resource allocation in such a way that some workload resource requests which exceed the policy owned amount reserved for said workloads, may nevertheless be filled if the cumulative resources allocated to all group members does not exceed said group policy owned amount limit, said resource allocation performance giving the effect that the sum of the policy owned amounts of the group members is shared by said group members.

32. A computer system as recited in claim 27 wherein, at least some of said group policy parameters, comprise group maximum resource amounts for one or more resources, distinct from the policy maximum resource amounts which may be assigned to the individual workloads and said resource planner considers said group maximum resource amounts in its allocation decisions.

33. A computer system as recited in claim 32 wherein said resource planner performs resource allocation in such a way that some workload resource requests which may not exceed the policy maximum amount reserved for said workloads, may nevertheless not be filled if the cumulative resources allocated to all group members does exceed said group policy maximum amount limit, said resource allocation performance giving the effect that the policy maximum amount of the group constrains the total amount of said resource available to said group members.

34. A computer system comprising:
plural containers for running respective workloads, wherein one or more computing resources are subject to monitoring and control, said containers being arranged in a container hierarchy, said resources including processors and at least one of storage media, communication or I/O devices or computer software programs stored on a non-transitory computer-readable storage medium, and/or licenses for the use of said resources;
a resource planner for planning an allocation of said resource type wherein said allocation planner makes allocation decisions based upon factors which include at least one of:
resource management policy parameters specifying resource constraints, and desired workload operating characteristics assigned automatically or by user selection to said workloads,
resource requests of said workloads,
the availability of said resources, and
the structural relationships of the resource containers,
wherein said workloads may be further identified, automatically or by users, by associations with other workloads, such associations including groups of workloads, and said resource planner further includes one or more supplementary allocation conditions through which said allocation decisions may be modified based upon the evaluation of said supplementary conditions, said conditions being evaluated for some of said resource requests of some of said workloads, to determine, in whole or in part, whether said requests for which resources may otherwise be available, shall be satisfied or not; and
wherein said container hierarchy includes:
a least-common ancestor container for said first group, said least-common ancestor containing all workload members of said first group, said least-common ancestor not having a child container that contains all members of said first group; and
at least a first base-level container containing exactly one workload member of said first group, said first base-level container not being a child of said least-common ancestor and not being a sole base-level descendant of a child of said least-common ancestor.

35. A computer system as recited in claim 34 wherein at least some of said workloads are further identified by associations with other workloads, such associations including groups of workloads, and at least some of said supplementary evaluation conditions consider group membership in said evaluations.

36. A computer system as recited in claim 35 wherein at least some of said groups of workloads are assigned one or more policy parameters, distinct from the policy parameters associated with the individual workloads and some of said supplementary evaluation conditions consider said policy parameters in their evaluations.

37. A computer system as recited in claim 36 wherein said supplementary condition evaluations consider said group policy parameters in their evaluations by keeping track of the allocation of resources to the members of the group and allowing or disallowing certain of said workload resource requests for workloads which are members of the group based at least in part on the relationship of the cumulative resources allocated to all group members to one or more of said group policy parameters.

38. A computer system as recited in claim 37 wherein at least some of said group policy parameters comprise group owned resource amounts for one or more resources, distinct from the policy owned resource amounts which may be assigned to the individual workloads.

39. A computer system as recited in claim 38 wherein at least some of the group owned resource amounts are specified to be the sums of the respective policy owned resource amounts of the respective members of the group.

40. A computer system as recited in claim 37 wherein at least some of said group policy parameters include group maximum resource amounts for one or more resources, distinct from the policy maximum resource amounts which may be assigned to the individual workloads.

* * * * *